Feb. 26, 1957  J. ANDERSON  2,783,294
STORAGE BATTERY
Filed Aug. 30, 1955
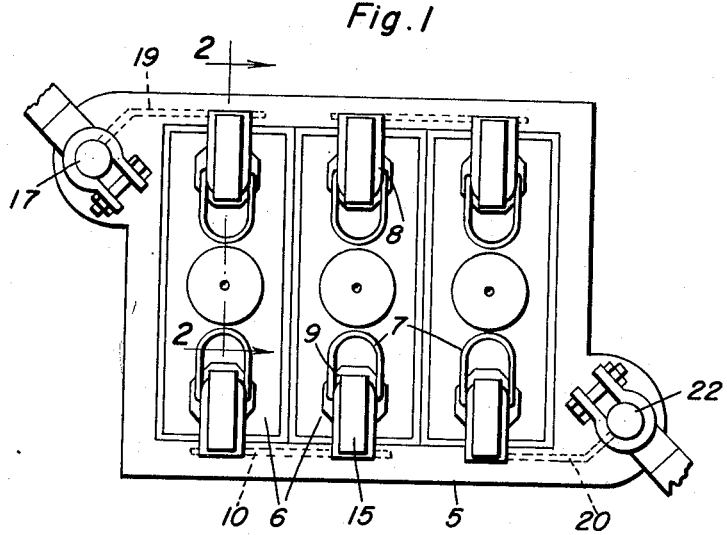
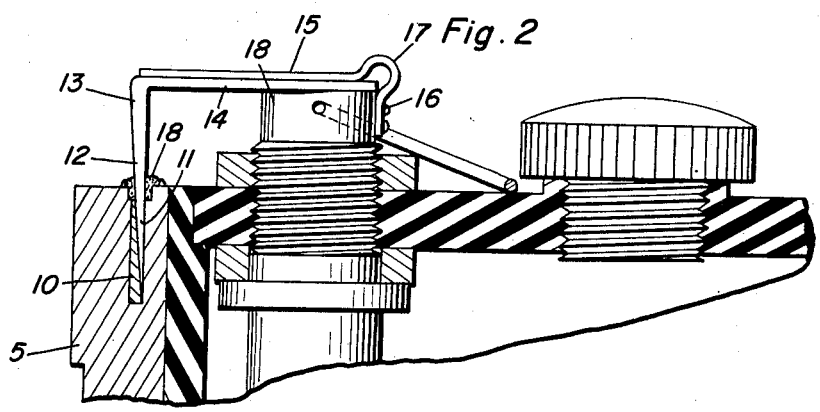
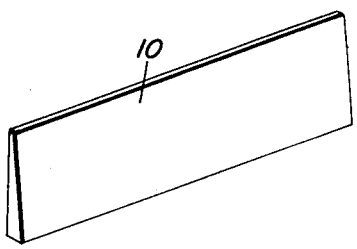
John Anderson
INVENTOR.

2,783,294
STORAGE BATTERY

John Anderson, Chicago, Ill., assignor to
Charles A. Toce, Sunland, Calif.

Application August 30, 1955, Serial No. 531,402

4 Claims. (Cl. 136—166)

The present invention relates to new and useful improvements in storage batteries comprising individually replaceable cells or battery units of a type covered in my prior U. S. Patent No. 2,395,652, dated February 26, 1946.

In my prior patent I employ conductors for the terminal posts and conductors for adjacent cells embedded in recesses in the battery casing or box and with which contactors leading from the cell posts are releasably engaged and it is an object of the present invention to provide a wedge fit between the conductors and the contactors in the recesses to increase frictional contacting engagement with each other and to improve the effectiveness of the connection.

Another object is to provide spring means holding the contactors engaged with the cell posts and for holding the contactors engaged with the conductors.

A further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view;

Figure 2 is an enlarged fragmentary vertical sectional view taken on a line 2—2 of Figure 1; and Figure 3 is an enlarged perspective view of one of the cell conductors.

Referring now to the drawing in detail wherein for the purpose of illustration I have disclosed a preferred embodiment of my invention, the numeral 5 designates a battery box or case of hard rubber or other suitable insulation material and in which a plurality of battery cells 6 are arranged in side by side relation with each other and adapted for removal from the case by wire bales or handles 7 secured to the posts 8 and 9 of the cells and constructed as described in my aforesaid Letters Patent.

Conductors 10 of suitable strap metal are embedded in the upper side walls of the case 5 in overlapping relation with respect to the end portions of adjacent cells and the upper longitudinal edge of the conductors are bevelled to a triangular or wedge shape in cross-section, as shown in Figure 2. A downwardly tapering groove 11 is formed in the case at the surface of the conductor provided with the bevelling and adapted to receive the downwardly tapering vertical end 12 of a wedge shaped contactor 13 for contacting the conductor with a wedge fit.

A horizontal arm 14 is formed at the upper end of the vertical contactor and which is held on top of an adjacent cell post by a horizontal portion of leaf spring 15 which is co-extensive in area with and positioned on top of the arm and the spring is formed with a downwardly extending leg 16 suitably secured to the side of the cell post. A loop 17 is formed at the junction of the horizontal and vertical portions of the spring to facilitate flexing thereof for releasing the contactor.

The conductors 10 and vertical portions 12 of the contactors are sealed in the grooves 11 by a suitable grease or other anticorrosive substance 18.

Conductors 19 and 20 are also embedded in the case 5 adjacent the ends of the latter to connect the positive and negative battery posts 21 and 22 with the contactors of the adjacent cells.

The wedge shaped conductors 10 and wedge shaped contactors 12 co-act with each other in providing a tight-fitting friction engaged connector for the battery cells and which may be easily separated for the replacement of the cells.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A storage battery comprising a case of insulation material, a plurality of cells removably placed in the case and each including a pair of posts, a conductor embedded in the upper portion of the case adjacent a pair of cells, a recess in the case at one side of the conductor, and a wedge shaped contactor connected to each cell post and extending downwardly into said recess in wedging contact with the conductor.

2. The construction of claim 1 wherein said conductor is wedge shaped and arranged in co-acting wedging contact with the contactor.

3. The construction of claim 1 wherein said conductor is constructed of strap metal and wedge shaped in cross section and arranged in co-acting wedging contact with the contactor.

4. The construction of claim 1 and including a horizontal arm on the contactor and overlying the top of an adjacent post, and a leaf spring attached to the post and overlying the arm to subject the contactor to downward wedging pressure with the conductor.

References Cited in the file of this patent

UNITED STATES PATENTS

| 882,110 | Hill | Mar. 17, 1908 |
|---|---|---|
| 1,091,185 | Boissier | Mar. 24, 1914 |
| 1,514,670 | Melchior | Nov. 11, 1924 |
| 1,908,803 | Edison | May 16, 1933 |
| 2,395,652 | Anderson | Feb. 26, 1946 |